US011866297B2

(12) United States Patent
Takahara et al.

(10) Patent No.: US 11,866,297 B2
(45) Date of Patent: Jan. 9, 2024

(54) ELEVATOR LANDING SILL DEVICE AND ELEVATOR DEVICE EQUIPPED WITH SAME

(71) Applicant: Hitachi, Ltd., Tokyo (JP)

(72) Inventors: Yu Takahara, Tokyo (JP); Shinsuke Ishitsuka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 85 days.

(21) Appl. No.: 17/769,351

(22) PCT Filed: Oct. 18, 2019

(86) PCT No.: PCT/JP2019/041129
§ 371 (c)(1),
(2) Date: Apr. 15, 2022

(87) PCT Pub. No.: WO2021/075053
PCT Pub. Date: Apr. 22, 2021

(65) Prior Publication Data
US 2023/0339726 A1 Oct. 26, 2023

(51) Int. Cl.
*B66B 13/30* (2006.01)

(52) U.S. Cl.
CPC .................................. *B66B 13/301* (2013.01)

(58) Field of Classification Search
CPC .................................................... B66B 13/303
See application file for complete search history.

(56) References Cited

U.S. PATENT DOCUMENTS 1,051,945 A * 2/1913 Dawson .................. B66B 13/28 187/400
2,120,081 A * 6/1938 Alexander .............. B66B 17/18 187/400
(Continued)

FOREIGN PATENT DOCUMENTS

JP 54-007649 A 1/1979
JP 54-085728 A 6/1979
(Continued)

OTHER PUBLICATIONS

International Search Report of PCT/JP2019/041129 dated Dec. 10, 2019.

*Primary Examiner* — Michael A Riegelman
(74) *Attorney, Agent, or Firm* — MATTINGLY & MALUR, PC

(57) ABSTRACT

An elevator landing sill device includes a landing sill provided along a lower edge of a landing opening, and a fixture fixed to a hoistway wall of a building, to which the landing sill is attached. The elevator landing sill device includes a partition member for sealing a gap between the landing sill and the hoistway wall. The partition member includes a center plate, the building-side mount part attached to one end of the center plate, a sill-side mount part attached to the other end of the center plate, a building-side rotating part for rotatably fixing the center plate and the building-side mount part, and the sill-side rotating part for rotatably fixing the center plate and the sill-side mount part. A building-side fastener for fixing the building-side mount part to the building, and a sill-side fastener for fixing the sill-side mount part to the landing sill are further provided.

11 Claims, 8 Drawing Sheets

(56) References Cited

U.S. PATENT DOCUMENTS

| | | | | | |
|---|---|---|---|---|---|
| 2,739,354 | A * | 3/1956 | Pope | B66B 17/18 187/400 |
| 4,579,503 | A * | 4/1986 | Disque | B60P 1/445 414/917 |
| 7,621,379 | B2 * | 11/2009 | Miller | B66B 13/301 187/400 |
| 9,604,822 | B2 * | 3/2017 | Roivainen | B66B 13/285 |
| 9,932,171 | B1 * | 4/2018 | Hall | H05K 999/99 |
| 11,034,549 | B2 * | 6/2021 | Hu | B66B 13/301 |
| 2015/0096842 | A1 * | 4/2015 | Cao | B66B 17/18 187/337 |
| 2018/0370770 | A1 * | 12/2018 | Wakasa | B66B 13/28 |
| 2019/0330027 | A1 * | 10/2019 | Hu | B66B 13/301 |
| 2019/0330028 | A1 * | 10/2019 | Hu | B66B 13/245 |

FOREIGN PATENT DOCUMENTS

| | | | | |
|---|---|---|---|---|
| JP | 55-026267 | B2 | | 7/1980 |
| JP | 59-013635 | B2 | | 3/1984 |
| JP | 59-199981 | A | | 11/1984 |
| JP | 2009-084029 | A | | 4/2009 |
| JP | 2013107768 | A | * | 6/2013 |
| JP | 2018008809 | A | * | 1/2018 |
| JP | 2021116914 | A | * | 8/2021 |
| KR | 101553220 | B1 | | 9/2015 |
| KR | 102121690 | B1 | * | 6/2020 |
| WO | WO-2023021788 | A1 | * | 2/2023 |

* cited by examiner

ELEVATOR LANDING SILL DEVICE AND ELEVATOR DEVICE EQUIPPED WITH SAME

TECHNICAL FIELD

The present invention relates to an elevator landing sill device for fixing a landing sill to a hoistway wall. More specifically, the present invention relates to an elevator landing sill device configured to seal the gap between the hoistway wall and the landing sill to prevent inflow of mortar used for finishing the landing floor from the gap to the inside of the hoistway, and relates to an elevator device equipped with the elevator landing sill device.

BACKGROUND ART

The generally employed elevator landing sill device has been disclosed in Japanese Patent Application Laid-Open No. 2009-84029 (PTL 1).

PTL 1 discloses the elevator landing sill device as described in claim 1 to be cited below. The elevator landing sill device includes a landing sill provided along a lower edge of a landing opening for guiding opening and closing operations of a landing door, a fixture that is fixed to a hoistway wall at the landing opening side using a first fastener including bolts, to which the landing sill is fixed using a second fastener including bolts, and a partition member that is held between the fixture and the landing sill, and fastened to the fixture jointly with the landing sill using the second fastener. The partition member seals a gap between the hoistway wall and the landing sill to prevent inflow of mortar used for finishing the landing floor to the inside of the hoistway from the gap. The fixture includes a wall-side member that is fixed to the hoistway wall using the first fastener, and a sill-side member to which the landing sill is fixed using the second fastener. The wall-side member and the sill-side member are joined to allow positional adjustment of the sill-side member in a height direction and a depth direction of the hoistway. The partition member includes a first held plate to be held between the hoistway wall and the wall-side member, and a second held plate to be held between the sill-side member and the landing sill. The first held plate has a first relief part formed to accommodate insertion of the bolt as the first fastener, and to allow change in the position of the first held plate to the bolt in the height direction. The second held plate has a second relief part formed to accommodate insertion of the bolt as the second fastener, and to allow change in the position of the bolt to the second held plate in the depth direction of the hoistway.

CITATION LIST

Patent Literature

PTL 1: Japanese Patent Application Laid-Open No. 2009-84029

SUMMARY OF INVENTION

Technical Problem

However, the landing sill device as disclosed in PTL 1 has the first held plate and the second held plate fixedly combined to constitute the partition member, and the first held plate is fixed to the vertical surface of the hoistway wall using the fastener. This may cause difficulty in provision of the partition member in the presence of a large dimension error of the building. There may be the case where the second held plate constituting the partition member protrudes from the side surface of the landing sill toward the hoistway, resulting in the problem of contact with the car.

An object of the present invention is to provide the elevator landing sill device, and the elevator device equipped with the same. Specifically, the elevator landing sill device can easily seal the gap between the landing sill and the hoistway wall without causing protrusion of the partition member toward the hoistway side even in the presence of the large dimension error of the building in the height direction and the depth direction of the hoistway so that outflow of the mortar to the inside of the hoistway can be prevented.

Solution to Problem

In order to attain the above-described object, the present invention provides an elevator landing sill device having a hoistway provided in a building for moving a car up and down, a landing opening formed at a hoistway side of the building, a landing sill disposed along a lower edge of the landing opening for guiding opening and closing operations of a landing door, and a fixture that is fixed to a hoistway wall of the building, having an upper part to which the landing sill is attached. The elevator landing sill device includes a partition member for sealing a gap between the landing sill and the hoistway wall. The partition member includes a center plate, a building-side mount part attached to one end of the center plate, a sill-side mount part attached to the other end of the center plate, a building-side rotating part for rotatably fixing the center plate and the building-side mount part, and a sill-side rotating part for rotatably fixing the center plate and the sill-side mount part. The device further includes a building-side fastener for fixing the building-side mount part to the building, and a sill-side fastener for fixing the sill-side mount part to the landing sill.

The present invention also provides an elevator device including a car which moves up and down in a hoistway of a building, a hoist for moving the car up and down, and an elevator landing sill device which is provided along a lower edge of a landing opening at a hoistway side of the building for guiding opening and closing operations of a landing door. The elevator landing sill device is the elevator landing sill device as described above.

Advantageous Effects of Invention

The present invention provides the elevator landing sill device, and the elevator device equipped with the same. The elevator landing sill device is effective for easily sealing the gap between the landing sill and the hoistway wall without causing protrusion of the partition member toward the hoistway side even in the presence of the large dimension error of the building in the height direction and the depth direction of the hoistway so that outflow of the mortar to the inside of the hoistway can be prevented.

DESCRIPTION OF EMBODIMENT

Figure 1:
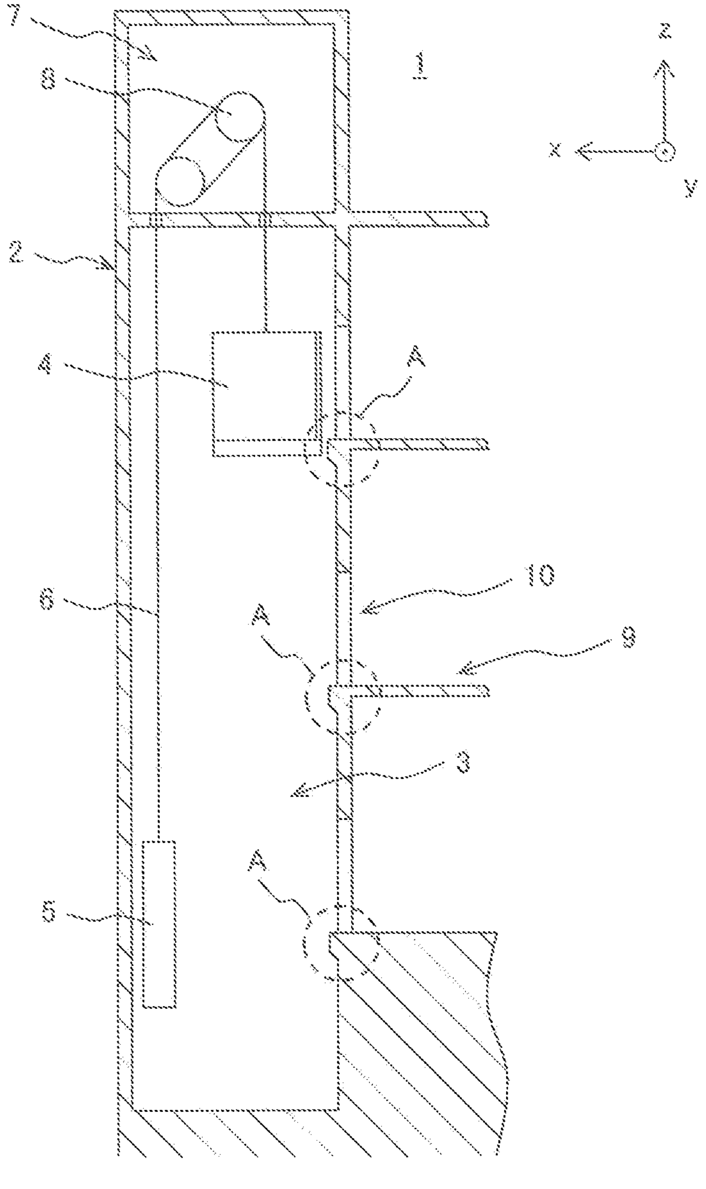
FIG. 1 is a schematic sectional view of an elevator device.

Specific examples of the elevator landing sill device according to the present invention will be described referring to the drawings. In the drawings, the same or similar parts are designated with the same codes.

Example 1

Referring to the schematic sectional view of FIG. 1, an explanation will be made with respect to a structure of a generally employed elevator device to which the present invention is applied. As FIG. 1 illustrates, an elevator device 1 includes a car 4, a counterweight 5, and a main rope 6 in a hoistway 3 of a building 2, and includes a hoist 8 in a machine room 7 of the building 2. The main rope 6 having one end connected to the car 4, and the other end connected to the counterweight 5 is hoisted using the hoist 8 so that the car 4 can be moved to an arbitrary floor.

A landing door 10 to be operated in association with opening and closing operations of a car door of the car 4 is provided on a landing 9 of each floor at a side of the hoistway 3. A lower end of the landing door 10 is slidably supported by a landing sill device A to be described later.

The following explanation will be made by defining the depth direction of the hoistway 3 as x-direction, the opening/closing direction of the landing door 10 as y-direction, and the lifting/lowering direction of the car 4 as z-direction.

Figure 2:
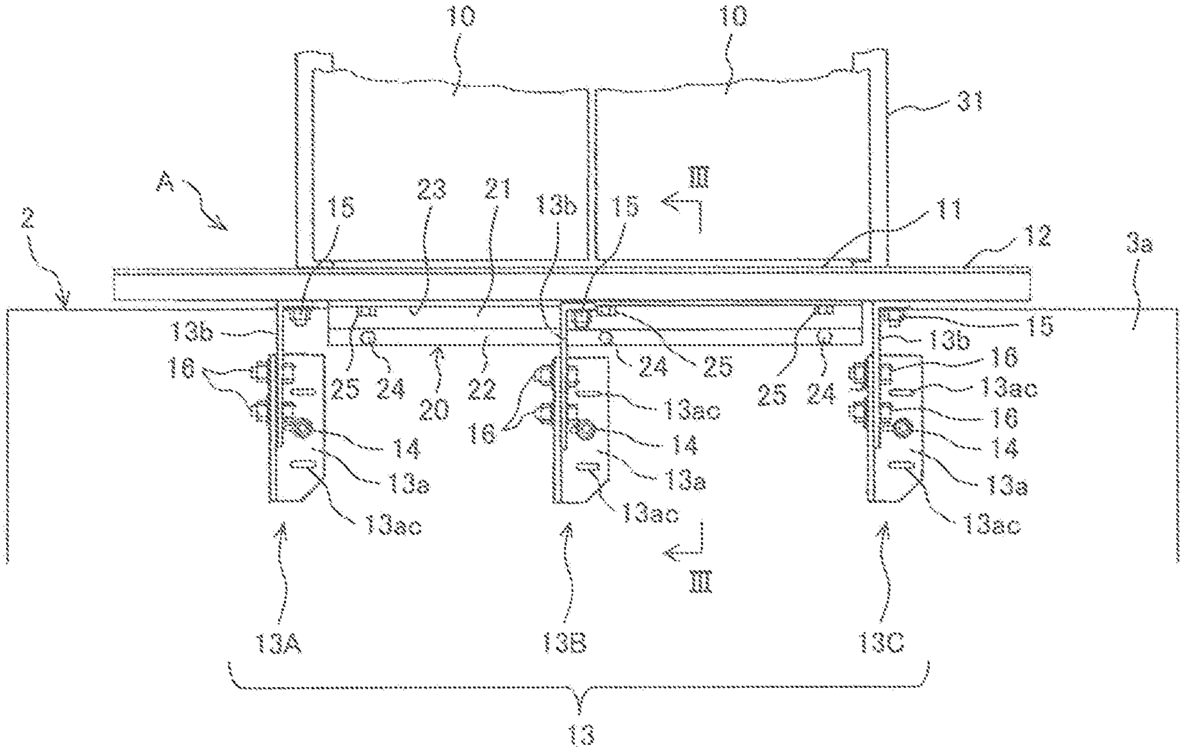
FIG. 2 is a front view of an elevator landing sill device as illustrated in FIG. 1, and a periphery of the device.
Figure 3:
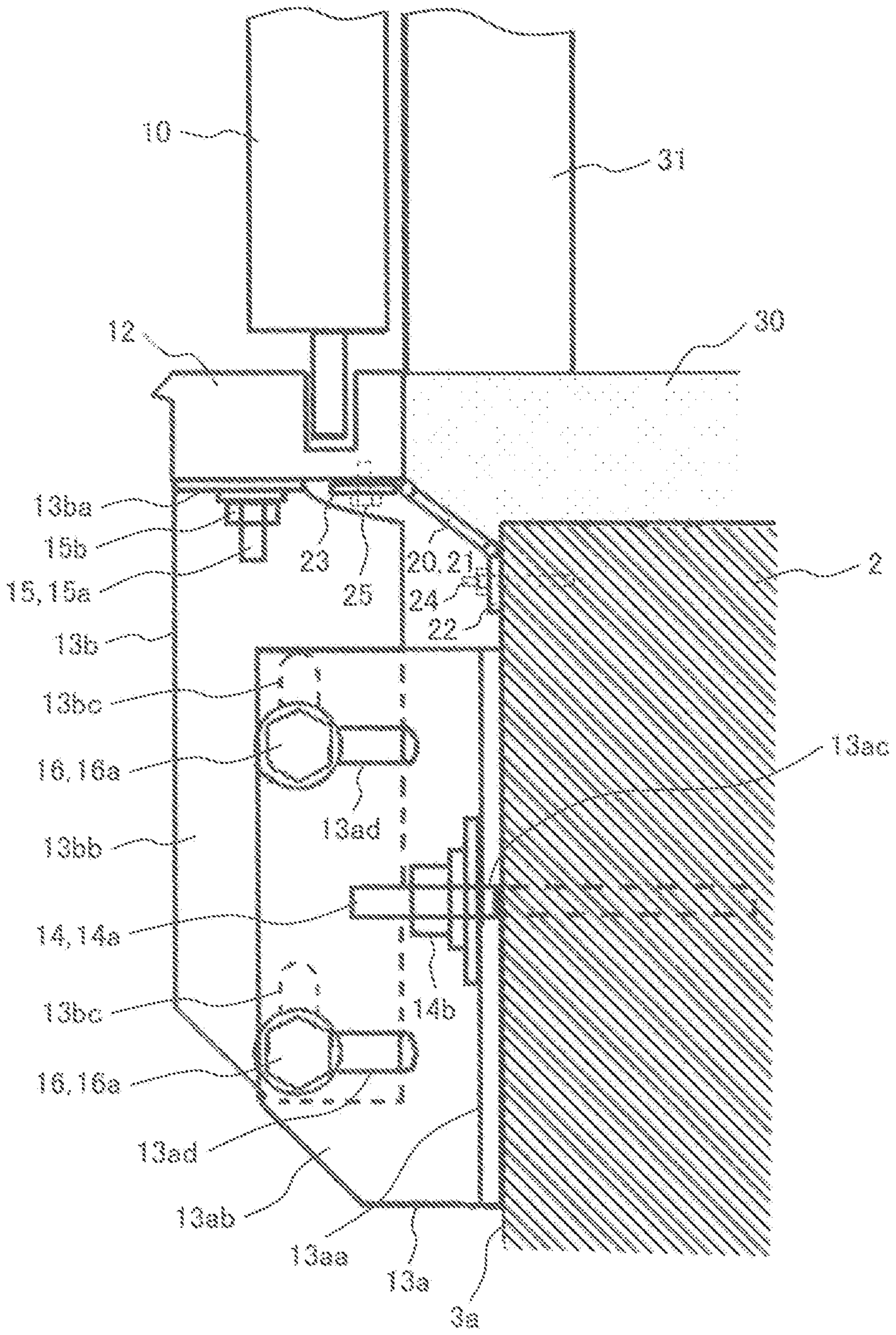
FIG. 3 is a side sectional view of an enlarged part of the elevator landing sill device as illustrated in FIG. 2.

Referring to FIGS. 2 and 3, an explanation will be made with respect to the elevator landing sill device on each floor of the elevator device as illustrated in FIG. 1. FIG. 2 is a front view of the elevator landing sill device as illustrated in FIG. 1, and a periphery of the device. FIG. 3 is a side sectional view of an enlarged part of the elevator landing sill device as illustrated in FIG. 2.

As FIG. 2 illustrates, the elevator landing sill device A according to Example 1 includes a landing sill 12 which is provided along a lower edge 11 of a landing opening, and guides opening and closing operations of the landing door 10. A hoistway wall 3*a* at the landing opening side has multiple fixtures 13, for example, three fixtures (13A, 13B, 13C) arrayed along the longitudinal direction of the landing sill 12. A first fastener 14 serves to fix each of the fixtures 13 to the hoistway wall 3*a*. A second fastener 15 serves to fix the landing sill 12 to each of the fixtures 13. A third fastener 16 serves to join a wall-side member 13*a* to be fixed to the hoistway wall 3*a* using the first fastener 14 and a sill-side member 13*b* to which the landing sill 12 is fixed using the second fastener 15.

Each of the fixtures 13A, 13B, 13C has the same structure. A detailed explanation will be made with respect to the structure referring to FIG. 3, taking the fixture 13B as an example. As FIG. 3 illustrates, the wall-side member 13*a* of the fixture 13B is fixed to the hoistway wall 3*a* using the first fastener 14 including an anchor bolt 14 and a nut 14*b*. The landing sill 12 is fixed to the sill-side member 13*b* using the second fastener 15 including a bolt 15*a* and a nut 15*b*. The wall-side member 13*a* and the sill-side member 13*b* are joined using the third fastener 16 including a bolt 16*a* and a nut 16*b* (see FIG. 2).

The wall-side member 13*a* includes a plate-like fixing margin 13*aa* which is fixed to the hoistway wall 3*a* using the first fastener 14 while extending along the hoistway wall 3*a*, and a plate-like joining margin 13*ab* which is joined with the sill-side member 13*b* using the third fastener 16 while extending from the fixing margin 13*aa* parallel to the depth direction (left-right direction as shown in FIG. 3) of the hoistway 3 and height direction.

The sill-side member 13*b* includes a plate-like joining margin 13*bb* which is joined using the third fastener 16 with the joining margin 13*ab* of the wall-side member 13*a* while being overlaid therewith, and a plate-like mounting margin 13*ba* which extends from the joining margin 13*bb* parallel to the left-right direction and the depth direction of the hoistway 3, to which the landing sill 12 is fastened using the second fastener 15.

The fixing margin 13*aa* of the wall-side member 13*a* has a bolt insertion part 13*ac* through which the anchor bolt 14*a* of the first fastener 14 is inserted. As FIG. 2 illustrates, the bolt insertion part 13*ac* is formed into a long hole which is long in the longitudinal direction (y-direction; left-right direction of FIG. 2) of the landing sill 12. This allows change in the position of the anchor bolt 14*a* to the fixing margin 13*aa* in the longitudinal direction of the landing sill 12. As FIG. 2 illustrates, multiple bolt insertion parts 13*ac*, for example, three bolt insertion parts are arranged at equal intervals in the height direction (z-direction).

The joining margin 13*ab* of the wall-side member 13*a* has a bolt insertion part 13*ad* through which the bolt 16*a* of the third fastener 16 is inserted. The bolt insertion part 13*ad* is formed into a long hole which is long in the depth direction (x-direction) of the hoistway 3. This allows change in the relative position between the bolt 16*a* and the wall-side member 13*a* in the depth direction of the hoistway 3.

The joining margin 13*bb* of the sill-side member 13*b* has a bolt insertion part 13*bc* through which the bolt 16*a* of the third fastener 16 is inserted. The bolt insertion part 13*bc* is formed into a long hole which is long in the height direction (z-direction). This allows change in the relative position between the bolt 16*a* and the sill-side member 13*b* in the height direction. In other words, the wall-side member 13*a* and the sill-side member 13*b* are joined by means of the bolt insertion parts 13*ad*, 13*bc* so that the position of the sill-side member 13*b* can be adjusted in the height direction and the depth direction (x-direction; left-right direction of FIG. 3) of the hoistway 3.

As FIGS. 2 and 3 illustrate, the partition member 20 is disposed to seal the gap between the landing sill 12 and the hoistway wall 3*a* of the building 2. The partition member 20 is formed into a hinge structure constituted by a center plate 21, a building-side mount part 22, and a sill-side mount part 23. The building-side mount part 22 and the sill-side mount part 23 are rotatably attached to the respective sides of the center plate 21. The building-side mount part 22 is fixed to the hoistway wall 3*a* of the building using an anchor bolt (building-side fastener) 24. The sill-side mount part 23 is attached to the lower surface of the landing sill 12 using a bolt 25 (sill-side fastener) 25. The partition member 20 seals the gap between the landing sill 12 and the hoistway wall 3*a* of the building 2 to prevent outflow of the mortar 30 poured to make the upper surface of the landing sill 12 flush with the landing floor surface to the inside of the hoistway 3 (see FIG. 1).

Although not shown in the drawing, a floor surface finishing member such as carpet, tile, flooring for forming the floor surface is laid on the upper surface of the mortar 30. Since the heavy load such as a cart other than humans may pass through the landing opening, the thickness or strength of the partition member 20 is determined so that its deformation is kept within an allowable value despite passage of the maximum permissible heavy load conveyable by the elevator.

Referring to FIGS. 2 and 3, a three-way frame 31 is provided at the landing opening. The inner width dimension of the three-way frame 31 is substantially the same as the width dimension of the landing opening. The width of the partition member 20 is set to be substantially the same as the width dimension of the landing opening.

The specific structure of the partition member 20 will be described referring to FIGS. 4 to 7.

Figure 4:
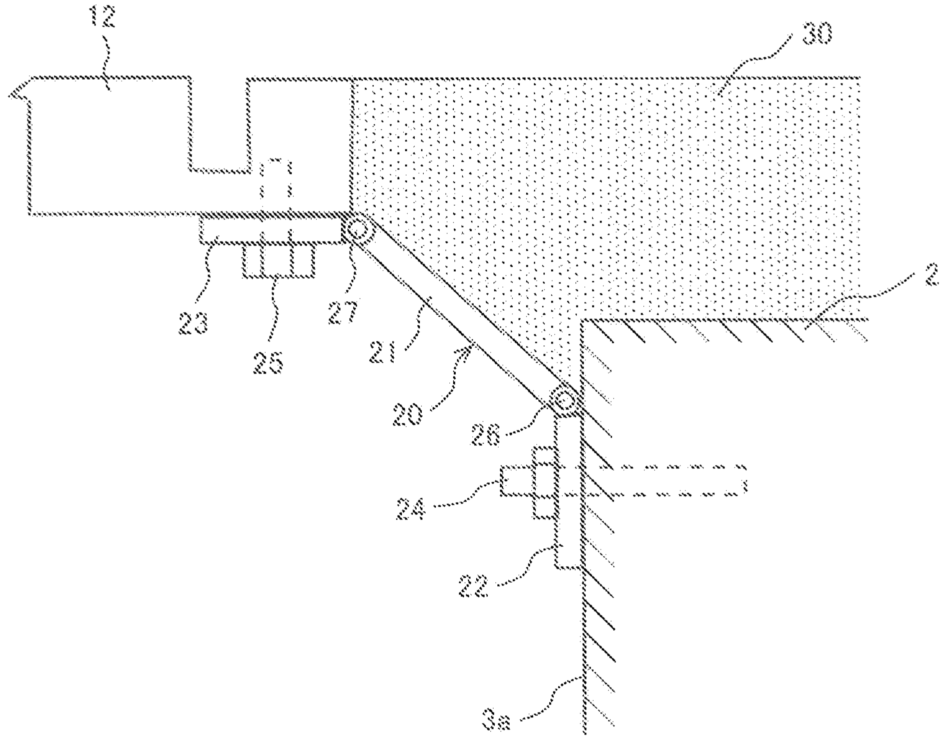
FIG. 4 is a side view representing a structure of a partition member as illustrated in FIG. 3.

FIG. 4 is a side view representing a structure of the partition member 20 as illustrated in FIG. 3. The partition member 20 includes the center plate 21, the building-side mount part 22 attached to the hoistway wall 3*a*, and the sill-side mount part 23 attached to the lower surface of the landing sill 12. The building-side mount part 22 is rotatably attached to one end of the center plate 21 via a shaft 26, and the sill-side mount part 23 is rotatably attached to the other end of the center plate 21 via a shaft 27.

The sill-side mount part 23 is fixed to a predetermined position of the lower surface of the landing sill 12 using the bolt 25. Preferably, the sill-side mount part 23 is structured to be in contact with the landing sill over an entire range in contact with the landing sill 12 in the left-right direction (y-direction) so as not to generate the gap. Preferably, the building-side mount part 22 is structured to be in contact with the hoistway wall 3*a* over an entire range in contact with the hoistway wall 3*a* in the left-right direction (y-direction) so as not to generate the gap. If the gap is unavoidably generated between the sill-side mount part 23 and the landing sill 12, or between the building-side mount part 22 and the hoistway wall 3*a*, it is preferable to provide the gap sealing member, for example, plastic sheet.

A positional relationship between the landing sill 12 and the building 2 is not constant. Dimension error of the building 2 makes the dimension between the hoistway wall 3*a* and the landing sill 12 variable. Even in the state where the sill-side mount part 23 is fixed to the landing sill 12, the partition member 20 of the example allows the position of the building-side mount part 22 to be freely changed by means of the two shafts 26, 27 in accordance with the dimension between the hoistway wall 3*a* and the landing sill 12. Accordingly, the anchor bolt 24 is driven into the hoistway wall 3*a* at a position corresponding to the building-side mount part 22 so that the building-side mount part 22 is vertically moved to be brought into tight contact with the hoistway wall 3*a*, and the anchor bolt 24 ensures to fix the building-side mount part 22 to the hoistway wall 3*a*, irrespective of the dimension between the hoistway wall 3*a* and the landing sill 12.

After fixing the partition member 20 to the hoistway wall 3*a* and the landing sill 12, as illustrated in FIGS. 3 and 4, the partition member 20 securely prevents outflow of the mortar 30 in the pouring process to the inside of the hoistway 3.

Figure 5:
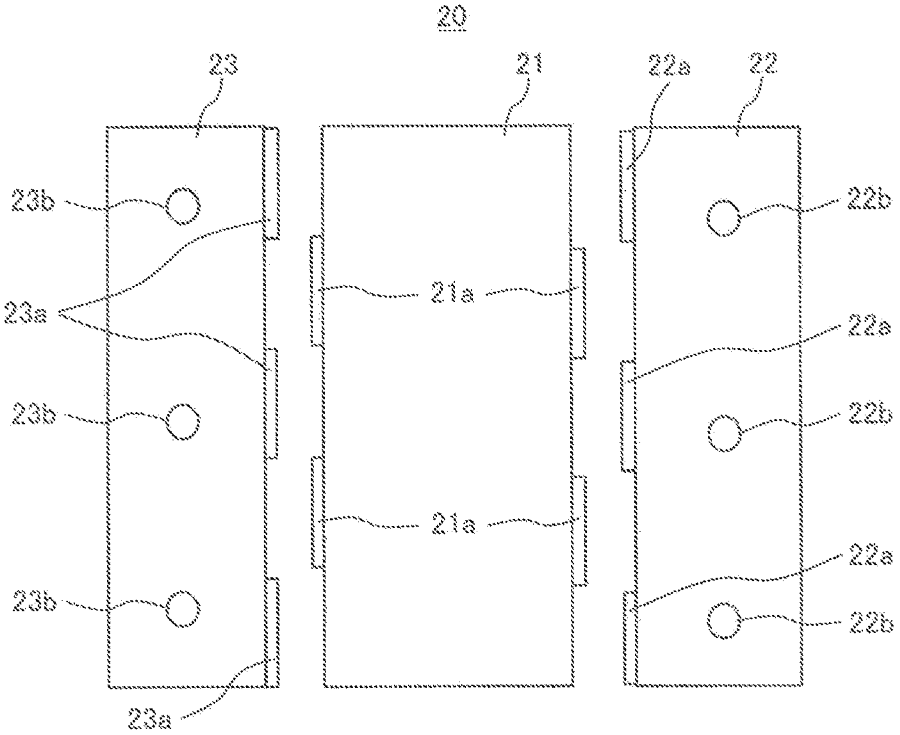
FIG. 5 is an explanatory view of the structure of the partition member, indicating a state before assembling a center plate, a building-side mount part, and a sill-side mount part.
Figure 6:
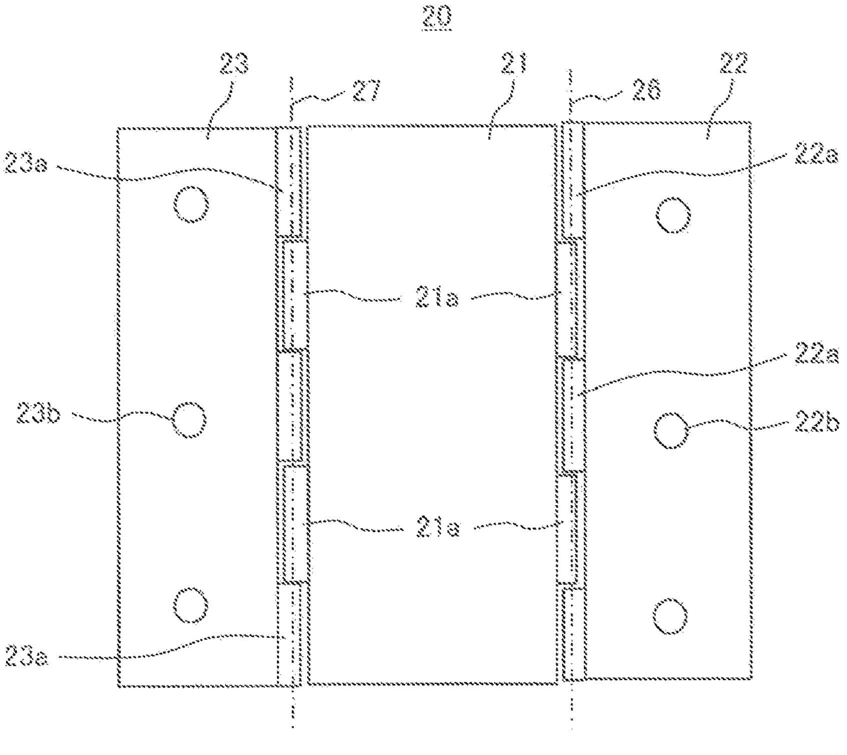
FIG. 6 is an explanatory view of the structure of the partition member, indicating a state after assembling the center plate, the building-side mount part, and the sill-side mount part.
Figure 7:
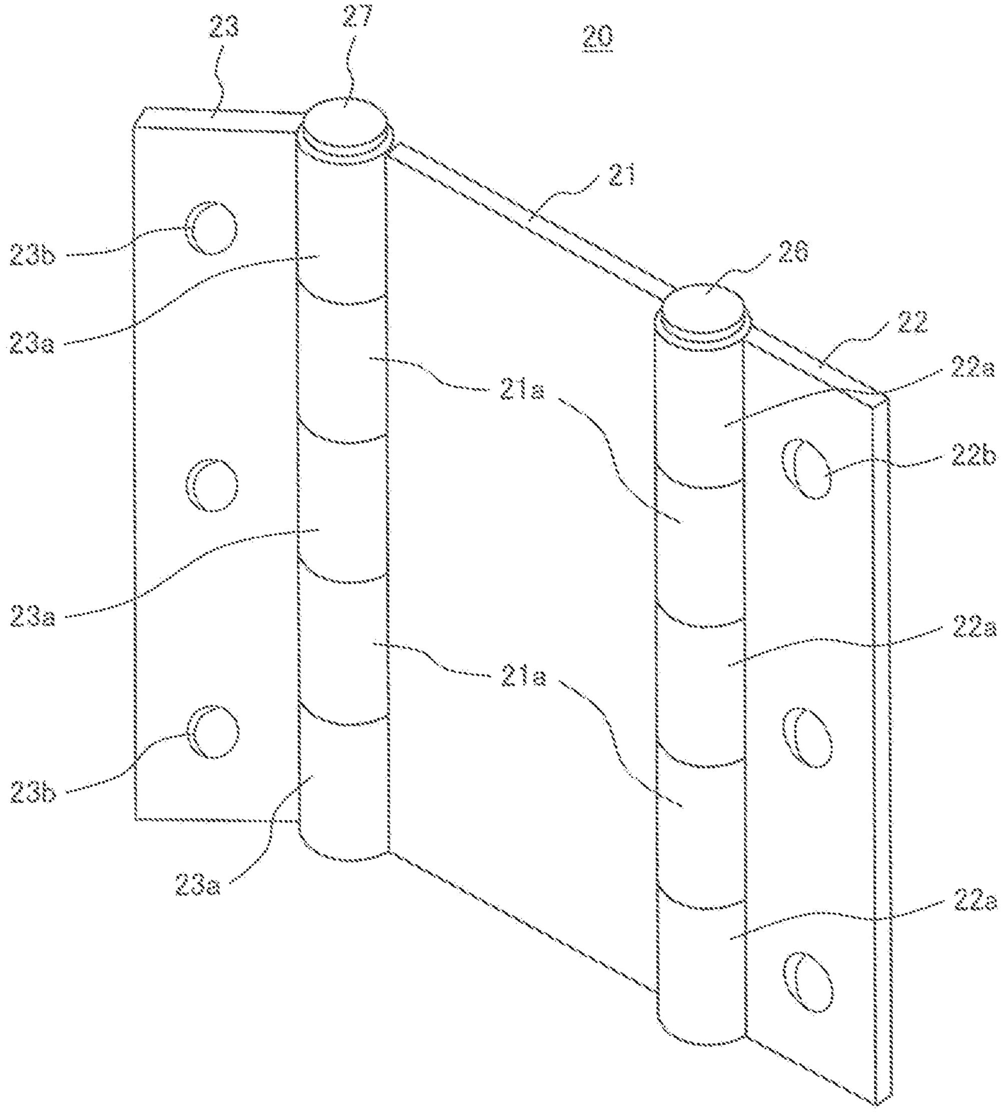
FIG. 7 is a perspective view of the partition member.

An explanation will be made with respect to a structure of the partition member 20 referring to FIGS. 5 to 7. FIG. 5 is an explanatory view of the structure of the partition member 20, indicating a state before assembling the center plate 21, the building-side mount part 22, and the sill-side mount part 23. FIG. 6 indicates a state where the center plate 21, the building-side mount part 22, and the sill-side mount part 23 have been assembled. FIG. 7 is a perspective view of the assembled partition member 20.

As FIG. 5 illustrates, multiple tubes 21*a* (two on each side in the example) through which the shafts 26, 27 penetrate are provided on the respective sides of the center plate 21. The building-side mount part 22 and the sill-side mount part 23 include multiple tubes 22*a*, 23*a* (three in the example) through which the shafts 26, 27 penetrate, respectively on sides connected to the center plate 21 at positions which are not interfered with the tubes 21*a*.

Multiple bolt holes 22*b*, 23*b* (three for each mount part in the example) are formed along the longitudinal direction of the partition member 20 (longitudinal direction of the landing sill 12; y-direction). The bolt hole 22*b* accommodates penetration of the anchor bolt 24 as illustrated in FIG. 4, and the bolt hole 23*b* accommodates penetration of the bolt 25 as illustrated in FIG. 4.

The center plate 21, the building-side mount part 22, and the sill-side mount part 23 are combined as illustrated in FIG. 6. The building-side mount part 22 and the sill-side mount part 23 are rotatably assembled with the center plate 21 by means of the shafts 26, 27.

FIG. 7 is a perspective view of the assembled partition member 20. The shaft 26 extending from one end to the other end of the partition member 20 penetrates through the tubes 22*a* of the building-side mount part 22 and the tubes 21*a* of the center plate 21 so that the building-side mount part 22 is rotatably attached to the center plate 21. The shaft 27 extending from one end to the other end of the partition member 20 penetrates through the tubes 23*a* of the sill-side mount part 23 and the tubes 21*a* of the center plate 21 so that the sill-side mount part 23 is rotatably attached to the center plate 21. Each of the shafts 26, 27 is provided with a stopper for preventing detachment from the partition member 20.

Figure 8:
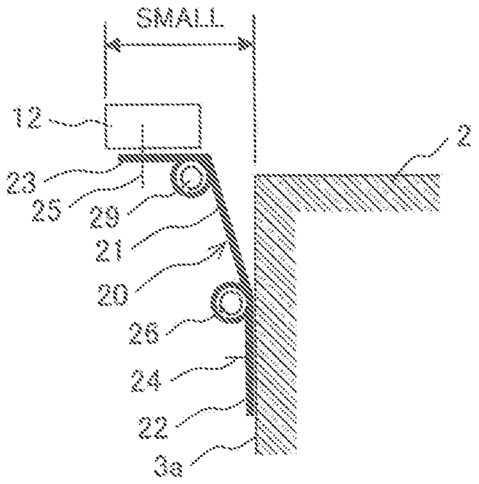
FIG. 8 is an explanatory view of an operation of the partition member in the case of a small gap between the building and the landing sill.
Figure 9:
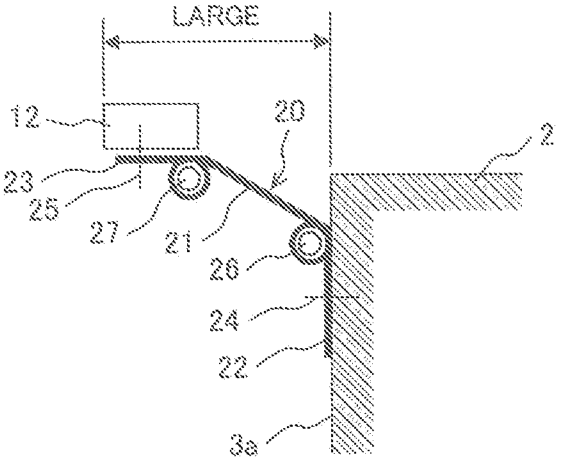
FIG. 9 is an explanatory view of the operation of the partition member in the case of a large gap between the building and the landing sill.

Referring to FIGS. 8 and 9, an explanation will be made with respect to operations of the partition member 20 when it is attached between the building 2 and the landing sill 12.

FIG. 8 is an explanatory view of an operation of the partition member 20 in the case of a small gap between the building 2 and the landing sill 12. In the case of the small dimension between the hoistway wall 3*a* and the landing sill 12 because of the building dimension error, the building-side mount part 22 is moved downward along the hoistway wall 3*a* to be in tight contact therewith while having the sill-side mount part 23 attached to the landing sill 12. In the above-described state, the anchor bolt 24 is driven into the hoistway wall 3*a* at the position corresponding to the bolt hole 22*b* of the building-side mount part 22. The anchor bolt 24 securely fixes the building-side mount part 22 to the hoistway wall 3*a* in the tight contact state.

FIG. 9 is an explanatory view of an operation of the partition member 20 in the case of a large gap between the building 2 and the landing sill 12. In the case of the large dimension between the hoistway wall 3*a* and the landing sill 12, the building-side mount part 22 is moved upward to be higher than the position as illustrated in FIG. 8 by means of the shafts 26, 27 so that the building-side mount part 22 is brought into tight contact with the hoistway wall 3*a*. The building-side mount part 22 can be securely in tight contact with the hoistway wall 3*a*. In the tight contact state, the anchor bolt 24 is driven into the hoistway wall 3*a* at the position corresponding to the bolt hole 22*b* of the building-side mount part 22. The anchor bolt 24 allows the building-side mount part 22 to be securely fixed to the hoistway wall 3*a* in the tight contact state.

The partition member 20 of the example allows the position of the building-side mount part 22 to be freely changed by means of the two shafts 26, 27 in accordance with the dimension between the hoistway wall 3*a* and the landing sill 12. The anchor bolt 24 is driven into the building 2 by positioning the building-side mount part 22 to be in tight contact with the hoistway wall 3*a* so that the partition member 20 can be constantly fixed in tight contact with the hoistway wall 3*a* and the landing sill 12 irrespective of the dimension therebetween. The example ensures to seal the gap between the hoistway wall 3*a* and the landing sill 12 easily and securely.

Figure 10:
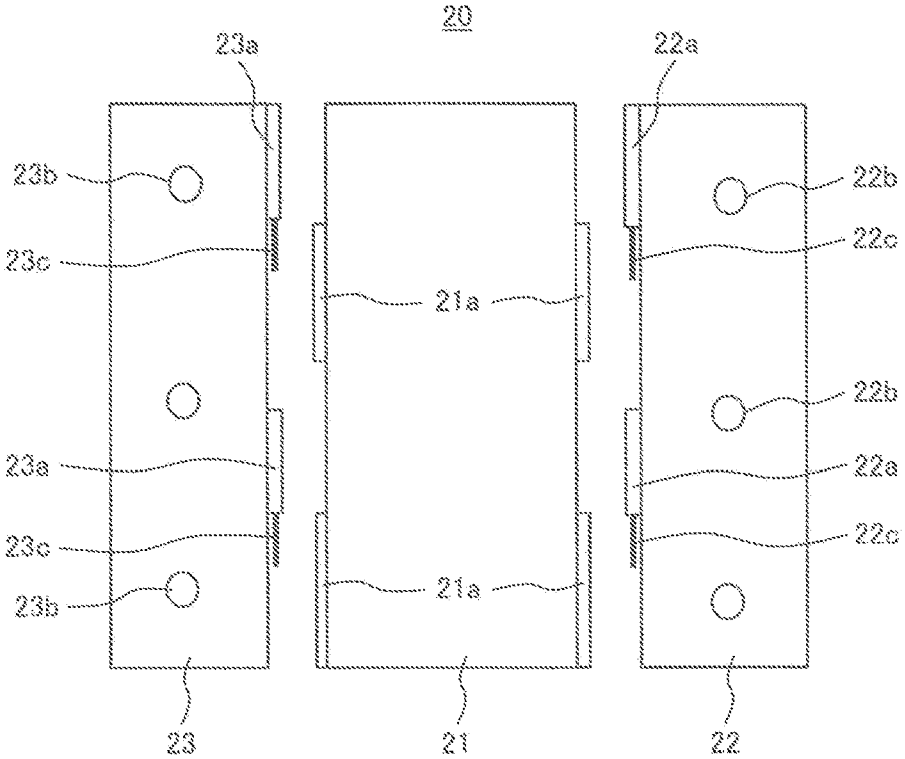
FIG. 10 is an explanatory view of another example of the partition member, which corresponds to FIG. 5.

In the foregoing example, the shaft 26 for connecting the center plate 21 with the building-side mount part 22 of the partition member 20, and the shaft 27 for connecting the center plate 21 with the sill-side mount part 23 are separately formed as individual members. The partition member may be configured as illustrated in FIG. 10. FIG. 10 is an explanatory view of another example of the partition member 20, which corresponds to FIG. 5.

The partition member 20 as illustrated in FIG. 10 has multiple tubes 21*a* on both sides (two for each side) of the center plate 21 for accommodating insertion of the shafts. Multiple tubes 22*a*, 23*a* (two for each in this example) are attached to the building-side mount part 22 and the sill-side mount part 23 at positions where those tubes are not interfered with the tubes 21*a* of the center plate 21. Shaft parts 22*c*, 23*c* to be inserted into the tubes 21*a* are fixed to the tubes 22*a*, 23*a*, respectively.

The above-described structure allows the building-side mount part 22 and the sill-side mount part 23 to be rotatably attached to the center plate 21 by inserting the shaft parts 22*c*, 23*c* into the tubes 21*a* of the center plate 21, respectively.

Between the opposite side to the shaft part 22*c* of the tube 22*a* of the building-side mount part 22 to be inserted between the tubes 21*a* of the center plate 21 and the tubes 21*a* of the center plate 21, it is necessary to form an axial gap having the length equal to or longer than the length of the shaft part 22*c* protruding from the tube 22*a* so that the shaft part 22*c* can be inserted in the tube 21*a*. In this example, the length of the shaft part of the tube 22*a* or the tube 21*a* is shorter than that illustrated in FIG. 5, and a gap is formed between the tube 22*a* and the tube 21*a* after assembly.

Similarly, between the opposite side to the shaft part 23*c* of the tube 23*a* of the sill-side mount part 23 inserted between the tubes 21*a* of the center plate 21 and the tubes 21*a* of the center plate 21, it is necessary to form an axial gap having the length equal to or longer than the length of the shaft part 23*c* protruding from the tube 23*a* so that the shaft part 23*c* can be inserted in the tube 21*a*.

In the case of potential leakage of the mortar 30 to the inside of the hoistway 3 from the gap in the pouring process even in the presence of the partition member 20 between the building 2 and the landing sill 12, the partition member 20 may be provided with the gap sealing member.

Figure 11:
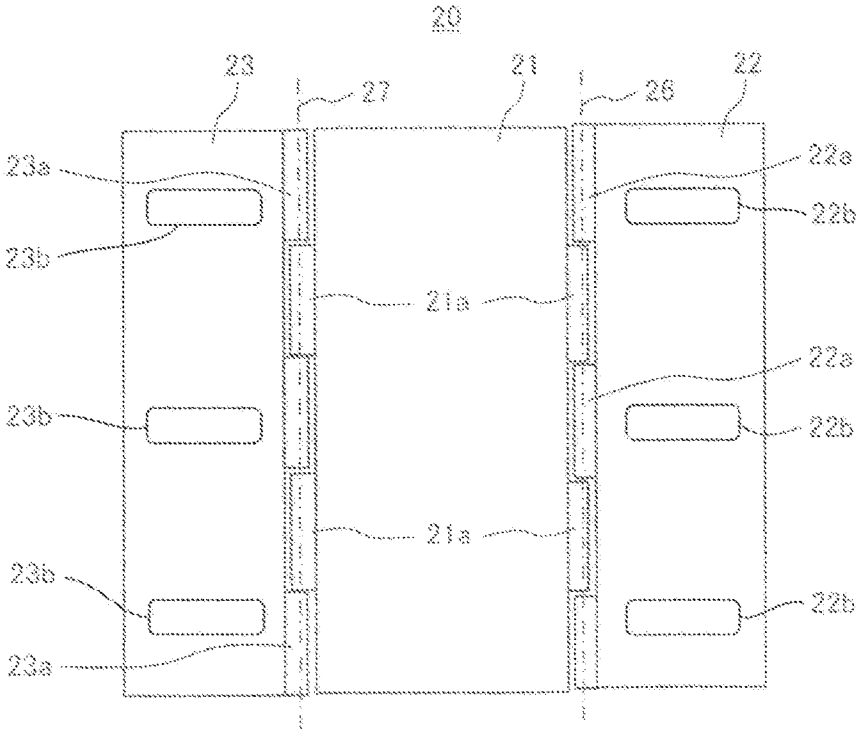
FIG. 11 is an explanatory view of still another example of the partition member, which corresponds to FIG. 6.

In the foregoing example, the bolt holes 22*b*, 23*b* formed in the building-side mount part 22 and the sill-side mount part 23 of the partition member 20 are formed into circular shapes. It is possible to form those bolt holes into long holes which are long in the short-length direction (direction perpendicular to the shafts 26, 27) of the building-side mount part 22 and the sill-side mount part 23 as illustrated in FIG. 11. FIG. 11 is an explanatory view of still another example of the partition member 20, which corresponds to FIG. 6.

As FIG. 11 illustrates, the bolt holes 22*b*, 23*b* are formed into long holes which are long in the short-length direction of the building-side mount part 22 and the sill-side mount part 23. Those holes allow the relative position between the anchor bolt 24 and the bolt hole 22*b*, or between the bolt 25 and the bolt hole 23*b* to be freely changed in accordance with the dimension between the hoistway wall 3*a* and the landing sill 12 in spite of variation in the dimension between the hoistway wall 3*a* and the landing sill 12. This makes it possible to bring the building-side mount part 22 into tight contact with the hoistway wall 3*a*, and the sill-side mount part 23 into tight contact with the landing sill 12. Accordingly, it is possible to fix the building-side mount part 22 to the hoistway wall 3*a*, and the sill-side mount part 23 to the landing sill 12 each in the tight contact state even after driving the anchor bolt 24 into the building 2.

The example as illustrated in FIG. 11 allows the partition member 20 to be constantly fixed to the hoistway wall 3*a* and the landing sill 12 in the tight contact state irrespective of the dimension between the hoistway wall 3*a* and the landing sill 12 even after driving the anchor bolt 24 into the building 2. Accordingly, in the example as illustrated in FIG. 11, it is possible to seal the gap between the hoistway wall 3*a* and the landing sill 12 further easily and securely.

In the foregoing example, it is possible to easily bring the building-side mount part 22 of the partition member 20 into tight contact with the hoistway wall 3*a*, and the sill-side mount part 23 into tight contact with the lower surface of the landing sill 12 in spite of variation in the dimension between the hoistway wall 3*a* and the landing sill 12. The partition member 20 ensures to seal the gap between the hoistway wall 3*a* and the landing sill 12. It is therefore possible to prevent inflow of the mortar 30 to be poured into the landing floor side of the landing sill 12 for finishing the landing floor to the inside of the hoistway 3 from the gap between the hoistway wall 3*a* and the landing sill 12.

In the example, it is possible to seal the gap between the hoistway wall 3*a* and the landing sill 12 by easily making the partition member 20 adaptable to the relatively large dimension error of the building in the height direction (z-direction) and the depth direction of the hoistway 3 (x-direction). This may solve the conventional problem of protrusion of the partition member toward the hoistway 3 from the side surface of the landing sill.

The present invention includes various modifications without being limited to the foregoing example.

In the example, the partition member 20 is composed of three members, that is, the center plate 21, the building-side mount part 22, and the sill-side mount part 23. The partition member 20 may be composed of four or more members in total including multiple center plates 21. It is possible to use the corrugated plate as the center plate 21 instead of the flat plate. The building-side mount part 22 and the sill-side mount part 23 may be structured to have only mount parts while leaving peripheries of the bolt holes 22*b*, 23*b* with no limitation to rectangular plates.

In the example, as FIGS. 3 and 4 illustrate, the building-side mount part 22 is fixed to the hoistway wall 3*a*, and the sill-side mount part 23 is fixed to the lower surface of the landing sill 12. It is also possible to fix the building-side mount part 22 to the upper surface of the building 2, and the sill-side mount part 23 to the side surface of the landing sill 12 with no limitation to those fixing positions.

The example has been described in detail for easy understanding of the present invention. Therefore, it is not necessarily limited to be configured to have all the components as described above.

REFERENCE SIGNS LIST

1 . . . elevator device,
2 . . . building,
3 . . . hoistway,
3*a* . . . hoistway wall,
4 . . . car,
5 . . . counterweight,
6 . . . main rope,
7 . . . machine room,
8 . . . hoist,
9 . . . landing,
10 . . . landing door,
11 . . . lower edge,
12 . . . landing sill,
13 (13A, 13B, 13C) . . . fixture,
13*a* . . . wall-side member,
13*aa* . . . fixing margin,
13*ab* . . . joining margin,
13*ac*, 13*ad* . . . bolt insertion part,
13*b* . . . sill-side member,
13*ba* . . . mounting margin,
13*bb* . . . joining margin,
13*bc* . . . bolt insertion part,
14 . . . first fastener,
14*a* . . . anchor bolt,
14*b* . . . nut,
15 . . . second fastener,
15*a* . . . bolt,
15*b* . . . nut,
16 . . . third fastener,
16*a* . . . bolt,
16*b* . . . nut,
20 . . . partition member,
21 . . . center plate,
21*a* . . . tube,
22 . . . building-side mount part,
22*a* . . . tube,
22*b* . . . bolt hole,
22*c* . . . shaft part,
23 . . . sill-side mount part,
23*a* . . . tube,
23*b* . . . bolt hole,
23*c* . . . shaft part,
24 . . . anchor bolt (building-side fastener),
25 . . . bolt (sill-side fastener),
26 . . . shaft (building-side rotating part),
27 . . . shaft (sill-side rotating part),
30 . . . mortar,
31 . . . three-way frame,
A . . . landing sill device

The invention claimed is:

1. An elevator landing sill device including a hoistway provided in a building for moving a car up and down, a landing opening formed at a hoistway side of the building, a landing sill disposed along a lower edge of the landing opening for guiding opening and closing operations of a landing door, and a fixture that is fixed to a hoistway wall of the building, having an upper part to which the landing sill is attached, the elevator landing sill device comprising a partition member for sealing a gap between the landing sill and the hoistway wall, wherein the partition member includes a center plate, a building-side mount part attached to one end of the center plate, a sill-side mount part attached to the other end of the center plate, a building-side rotating part for rotatably fixing the center plate and the building-side mount part, and a sill-side rotating part for rotatably fixing the center plate and the sill-side mount part; and a building-side fastener for fixing the building-side mount part to the building, and a sill-side fastener for fixing the sill-side mount part to the landing sill are provided.

2. The elevator landing sill device according to claim 1, wherein the building-side mount part of the partition member is fixed to the hoistway wall of the building using the building-side fastener, and the sill-side mount part is attached to a lower surface of the landing sill using the sill-side fastener.

3. The elevator landing sill device according to claim 2, wherein the partition member has the building-side mount part rotatably attached to the one end of the center plate via a shaft, and the sill-side mount part rotatably attached to the other end of the center plate via a shaft.

4. The elevator landing sill device according to claim 3, wherein multiple tubes through which the shafts penetrate are provided on both sides of the center plate of the partition member, and the building-side mount part and the sill-side mount part have multiple tubes through which the shafts penetrate on sides connected to the center plate, each at a position that is not interfered with the tubes of the center plate.

5. The elevator landing sill device according to claim 4, wherein the building-side fastener is an anchor bolt, and the sill-side fastener is a bolt; and the building-side mount part of the partition member has multiple bolt holes which allow insertion of the anchor bolt in a longitudinal direction, and the sill-side mount part has multiple bolt holes which allow insertion of the bolt in the longitudinal direction.

6. The elevator landing sill device according to claim 5, wherein the bolt holes formed in the building-side mount part and the sill-side mount part of the partition member are formed into long holes, each of which is long in a short-length direction of the building-side mount part or the sill-side mount part.

7. The elevator landing sill device according to claim 4, wherein the partition member includes multiple tubes provided on both sides of the center plate, through which the shafts are inserted, each of the building-side mount part and the sill-side mount part is provided with multiple tubes at positions which are not interfered with the tubes of the center plate, shaft parts to be inserted into the tubes of the center plate are fixed to the tubes of the building-side mount part and the sill-side mount part, and the building-side mount part and the sill-side mount part are rotatably attached to the center plate by inserting the shaft parts into the tubes of the center plate.

8. The elevator landing sill device according to claim 1, wherein the partition member has its thickness or strength determined to keep deformation of the partition member within an allowable value in spite of passage of a maximum permissible heavy load conveyable by the elevator.

9. The elevator landing sill device according to claim 1, wherein the sill-side mount part of the partition member is configured to be in contact with the landing sill over an entire range in a left-right direction, and the building-side mount part is configured to be in contact with the hoistway wall over an entire range in contact with the hoistway wall in the left-right direction.

10. The elevator landing sill device according to claim 1, comprising a member for sealing a gap generated between the sill-side mount part of the partition member and the landing sill, or a gap generated between the building-side mount part and the hoistway wall.

11. An elevator device comprising a car which moves up and down in a hoistway of a building, a hoist for moving the car up and down, and an elevator landing sill device which is provided along a lower edge of a landing opening at a hoistway side of the building for guiding opening and closing operations of a landing door, wherein the elevator landing sill device is the elevator landing sill device according to claim 1.

* * * * *